United States Patent [19]

La Fiandra

[11] Patent Number: 5,411,617
[45] Date of Patent: May 2, 1995

[54] METHOD FOR USE IN FABRICATING AND/OR TESTING A THIN MIRROR

[75] Inventor: Carlo La Fiandra, New Canaan, Conn.

[73] Assignee: Hughes Aircraft Company, Los Angeles, Calif.

[21] Appl. No.: 53,082

[22] Filed: Apr. 26, 1993

[51] Int. Cl.$^6$ ............................................. B32B 31/00
[52] U.S. Cl. .................................... 156/154; 156/292; 156/294; 156/297; 156/344; 359/838; 359/846; 359/900; 414/676; 414/780
[58] Field of Search .................. 51/284 R; 65/182.2; 248/683, 363, 694; 359/399, 727, 838, 846, 848, 849, 871, 900; 414/676, 758, 780, 781; 156/154, 297, 292, 294, 344

[56] References Cited
U.S. PATENT DOCUMENTS

| | | | |
|---|---|---|---|
| 3,332,759 | 7/1967 | McMaster et al. | 414/676 X |
| 4,422,893 | 12/1983 | Duchateau et al. | 156/297 X |
| 4,684,113 | 8/1987 | Douglas et al. | 269/21 |
| 4,850,152 | 7/1989 | Heynacher et al. | 51/284 R X |
| 5,078,776 | 1/1992 | Kajii et al. | 414/676 X |
| 5,336,288 | 8/1994 | Carlomagno et al. | 65/182.2 |

*Primary Examiner*—Mark A. Osele

[57] ABSTRACT

A method of fabricating a thin mirror (10) includes the step of supporting the thin mirror (10) on an air cushion (12) while a rigid support structure (16) is interfaced therewith. The disclosed method avoids the introduction of stresses and strains during the fabrication process.

17 Claims, 3 Drawing Sheets

METHOD FOR USE IN FABRICATING AND/OR TESTING A THIN MIRROR

BACKGROUND OF THE INVENTION

The present invention generally relates to a method for use in fabricating and/or testing a thin mirror and, in particular, relates to one such method including the step of interfacing a rigid support structure with the thin mirror such that stress and strain in the mirror are avoided.

In the field of optics, there is an ever increasing demand for larger and larger diameter mirrors. One reason for this demand is that, as is well known in the field of astronomy, the distance for which a telescope is practical is dependent upon the amount of light the telescope mirror can capture. Hence, one approach for capturing more light in a telescope is to increase the size of the mirror. However, as the size of the mirror is increased, significant problems occur.

One problem that must be addressed is that the mass of the optic significantly increases with even relatively small increases in the diameter. One approach to compensate for this problem has been to reduce the thickness of the mirror to thereby reduce the mass of the optic. Such an approach, however, introduces additional difficulties that can often counter the advantages achieved by the reduction of mass. One such difficulty is that as the optic is made thinner, it becomes more susceptible to deformation from its own weight. That is, a thin mirror can develop optical surface deformations simply because portions of the optic sag under its own weight.

Typically, the more conventional approach to addressing the problem of such deformations has been to fabricate the optic in relatively thick rigid segments and, when ready for use, arrange or assemble the segments to align the optical surfaces. The premise of this approach is that each segment can be fabricated to avoid such mass to thickness difficulties. Usually when the optic is assembled the segments are independently shifted to provide the desired optical surface. In many instances, the position of each segment is controllable by actuators that contact the rear of the segment and which can move the segment as needed to provide orientation and alignment of the front optical surface.

However, the arrangement of segments to form a high quality optical surface is quite expensive and introduces considerable complexity to the design of the optic. In addition, such an approach carries a substantial weight penalty that is very undesirable for mirrors to be launched into space.

Another approach to resolving the mass to thickness difficulties that are inherent in large thin optics is to shape the optic as a single piece and employ actuators to drive the optic to the desired shape.

To date, this latter approach has exhibited some particular drawbacks that can cause the catastrophic loss of an entire optic. One such drawback stems from the fact that, during conventional fabrication, internal stresses and strains are introduced into the optic. Such internal stresses and strains can cause the optic to crack or fracture either during the fabrication process of the optic or when actuators are activated during the use of the optic.

Another drawback is that during the fabrication process deformations of various spatial frequencies that cannot be removed by actuators can be introduced. For example, deformations having high spatial frequencies, i.e., where the surface deformations are between the actuators, cannot be corrected by the actuators.

A further difficulty in the fabrication of thin optics is that the optic, even during fabrication, is quite flexible. This flexibility makes it very difficult to fabricate and certify these thin optics to tight geometrical tolerances. Any geometrical differences from the final desired shape usually means that the optic is either stressed, strained, or both.

Currently, such thin optics are fabricated by initially generating a very rigid block of granite so that the surface thereof matches the rear surface of the optic to be formed. The generated surface of the block of granite is intended to match the rear surface of the optic in a strain free manner. The optic is then attached to the granite with some form of adhesive, such as, pitch. In reality, the rear surface of the optic rarely truly matches the front surface of the block of granite. As a result of the mismatch additional strain is introduced into the optic during the optical surface finishing process. Conventionally, after adhering the optic to the block, the surface thereof is generated with the optic in the strained condition. The optic is then usually tested on the granite block and then again tested on a fixture that attempts to secure the optic without introducing additional stress or strain. Thereafter, the optic is installed in an optical system that includes, among other components, a plurality of actuators to forcibly adjust the surface into the desired configuration. It is readily understood that, if the optic has suffered internal stresses and strains during fabrication, the forces exerted by the actuators can cause the optic to fracture and/or have an optical figure that is beyond the range of being corrected.

In addition, there is usually at least one process step during the manufacturing process that involves subjecting the optic to temperatures greater than room temperature. Such a step almost inherently creates a built in strains in the optic when the optic is returned to room temperature.

Consequently, it is highly desirable to develop a method for use in fabricating and/or testing a thin mirror that, in fact, reduces the stresses or strains introduced into the optic material.

SUMMARY OF THE INVENTION

Accordingly, it is one object of the present invention to provide a method of fabricating and/or testing thin mirrors without introducing the stresses and strains associated with conventional thin mirror fabrication processes.

This object is accomplished, at least in part, by providing a method for fabricating a thin optic including the step of interfacing a rigid support structure to the thin mirror while the thin mirror is substantially free of stress and strain.

Other objects and advantages of the present invention will become apparent to those skilled in the art from the following detailed description of the invention read in conjunction with the appended claims and the drawing attached hereto.

BRIEF DESCRIPTION OF THE DRAWING

The drawings, not drawn to scale, include.

DETAILED DESCRIPTION OF THE INVENTION

Figure 1A:
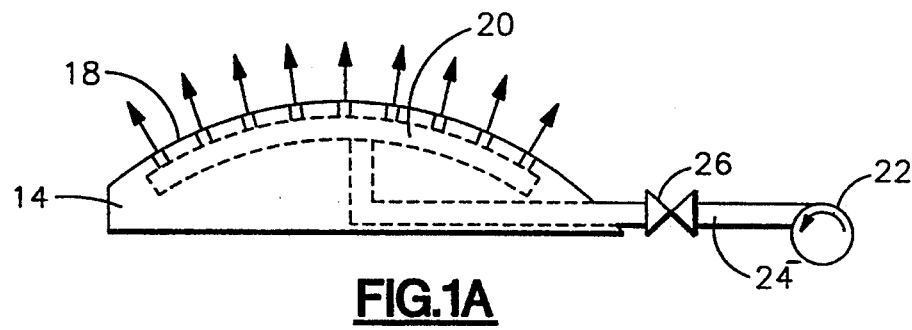
FIGS. 1A–1E which show a thin mirror during sequential steps of a method for fabricating a thin mirror embodying the principles of the present invention.

A method for use in fabricating and/or testing a thin mirror, generally indicated at 10 in the Figures, the general steps of which are shown in FIGS. 1A–1E and embodying the principles of the present invention, includes the steps of forming an air beating, or cushion 12 by means of an air bearing frame 14, interfacing the thin mirror 10 to a rigid support structure 16 while the thin mirror 10 is supported in a stress and strain free manner by the air bearing 12, and finishing the thin mirror 10 while attached to the rigid support structure 16.

In the preferred method of fabricating a thin mirror 10, an air bearing 12 is provided via the air bearing frame 14 to support the thin mirror 10 during the interfacing thereof to the rigid support structure 16. While the air bearing frame 14 can be fabricated by any technique known in the art, in one embodiment, the air bearing frame 14 is made from sintered bronze or other reasonably porous material. Alternatively, the air beating frame 14 can be fabricated from almost any material that can be machined, i.e., material that can be shaped by conventional machine tools. In the embodiment where the air beating frame 14 is a nonporous machinable material, the bearing surface 18 of the air beating frame 14 is provided with a plurality of openings 20 such that flow patterns are generated on the surface 18 through which air can be pumped to support the thin mirror 10 during the interfacing of the rigid support structure 16 with the thin mirror 10. Typically, in operation, the air bearing 12 is formed by the use of a source 22 of pressurized air, such as an air pump, that pneumatically communicates with the openings 20 via an air conduit 24. Preferably, an air pressure regulator 26 is provided in the line between the air source 22 and the conduit 24.

Regardless of the specific structure of the air bearing frame 14, the beating surface 18 of the frame 14 is, preferably, machined or otherwise finished to the general shape of the thin mirror 10. After the general machining of the bearing surface 18 of the air bearing frame 14, a polishing grit can be applied to either the thin mirror 10 or the bearing surface 18 of the air bearing frame 14. The thin mirror 10 and the bearing surface 18 can then placed together and the thin mirror 10 is ground until the optical surface 28 of the thin mirror 10 closely matches the air bearing surface 18. Alternatively, the optical surface 28 and the air bearing surface 18 can be independently generated using conventional techniques, e.g., by use of a computer controlled optical grinder, to match each other. Typically, the match should be close enough so that the air bearing frame 14 will act as an air bearing 12, for example, a match of between about 0.0002" to 0.001" between substantially all points of the surfaces, 18 and 28, is sufficient. In practice, the criteria for the surface matching is to ensure that the air cushion 12 generated is such that, with reasonable air flow, the thin mirror 10 is essentially uniformly fully supported by the cushion 12.

The thin mirror 10 is placed on the air bearing frame 14 with the optical surface 28 facing the air bearing frame 14 and the air bearing frame 14 is pressurized by means of the source 22 of pressurized air. The pressure is increased until the thin mirror 10 is fully supported from the air bearing surface 18 of the air bearing frame 14. Preferably, the pressure is increased until there is a cushion 12 of air about 0.0002' to 0.001' between the air bearing surface 18 and the optical surface 28 of the thin mirror 10.

It is important to recognize that as long as the thin mirror 10 is floating on the air cushion 12, the thin mirror 10 is uniformly supported and is subjected to negligible differential or point loads that may introduce mechanical stresses and strains.

While the thin mirror 10 is floating on the air cushion 12, the rigid support structure 16 is brought to an interfacing position with the rear surface 30 of the thin mirror 10. In general the rigid support structure 16 is used to support the thin mirror 10 during the finishing of the optical surface 28 thereof. The rigid support structures described herein are preferably massive and mechanically stable such that vibrations do not affect the finishing process. Such a rigid support structure can be either a single massive structure or, alternatively, can be made in several pieces for easier handling and bolted together during use. The interfacing of the rigid support structure 16 with the thin mirror 10 is preferably accomplished in accordance with either one of the two following techniques.

Figure 1B:
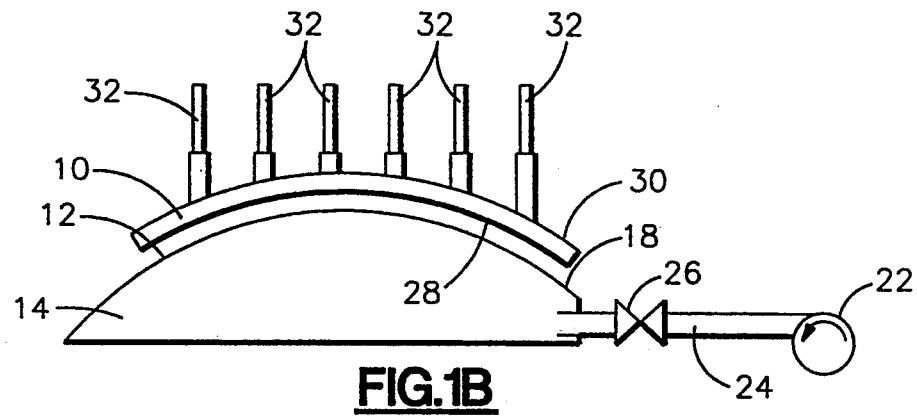

In the first technique, as shown in Figure 1B, a plurality of rigid support members 32 are removably affixed to the rear surface 30 of the thin mirror 10. Preferably, the rigid support members 32 are attached any time prior to floating the thin mirror 10 on the air cushion 12. In fact, the rigid support members 32 can be affixed to the rear surface 30 of the thin mirror 10 prior to the previously discussed grinding step for matching the air beating surface 18 of the air bearing frame 14 to the optical surface 28. In order to avoid the introduction of stresses and strains due to the weight of such rigid support members 32, the rigid support members 32 are preferably fabricated from a lightweight configuration and material, such as, for example, beryllium, aluminum, plastic, or the like. Further, the mechanical structure of the rigid support members 32 is selected to ensure that the members 32 remain rigid and fully support the thin mirror 10 during subsequent processing steps. Typically, in this first technique, the rigid support members 32 will be tubular and, preferably, are attached such that they are substantially parallel with each other and with the axis of the thin mirror 10.

In this first technique, the rigid support structure 16 is fabricated with a plurality of through holes 34, or openings, extending from a front surface 36 thereof through a rear surface 38 thereof. The location of the openings 34 in the rigid support structure 16 correspond to the location of the rigid support members 32 and are sized as clearance holes with respect to the periphery of the rigid support members 32. Hence, the rigid support structure 16 can be lowered so that the front surface 36 thereof is proximate the rear surface 30 of the thin mirror 10 without physically contacting the rigid support members 32 or the thin mirror 10. Clearly, if the openings 34 of the rigid support structure 16 were sized to contact or make a frictional force interface with the rigid support members 32 the usefulness and advantage of using the stress and strain free floating cushion 12 would be obviated entirely.

Once the rigid support structure 16 is interfaced, or positioned, so that the rigid support members 32 extend into the clearance openings 34, the rigid support members 32 are, in this technique, secured directly to the rigid support structure 16. In one embodiment, of this first technique, the rigid support members 32 are secured to the rigid support structure 16 by introducing an adhesive into the openings 34 from the rear surface 38 of the rigid support structure 16. Preferably, the adhesive is an epoxy that cures at room temperature and which can be removed or dissolved by a solvent or by the use of localized heat applied to the attachment point without introducing thermal deformation into the thin mirror 10. Preferably, before the rigid support structure 16 is lowered to interface with the rigid support members 32, and further, even before the thin mirror 10 is floated, each rigid support member 32 is provided with a seepage prevention seal 40 to prevent the unrestrained flow of adhesive over the rear surface 30 of the thin mirror 10 when the adhesive is introduced into the openings 34 of the rigid support structure 16. In one particular embodiment, the seepage prevention seals 40 are cloth rings, such as, for example, felt rings.

Figure 2:
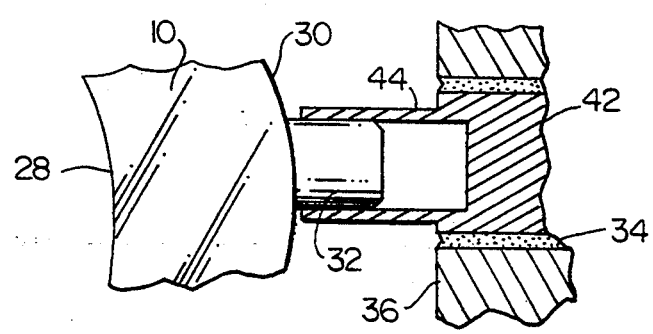
FIG. 2 which is a cross-sectional view of a fixture particularly adapted for use in conjunction with the method of the present invention.

Alternatively, as shown in FIG. 2, the rigid support structure 16 may be provided with attachment members 42 removably disposed in the openings 34, each attachment member 42 being provided with a sleeve 44 extending toward the rear surface 30 of the thin mirror 10. During the interfacing of the rigid support structure 16 with the thin mirror 10 the sleeves 44 would be heated to allow the rigid support structure 16 to be lowered with the sleeves 44 extending over but not in contact with the rigid support members 32. In this attachment, the rigid support members 32, for reasons discussed below, could be permanently attached to the rear surface 30 of the thin mirror 10. Upon cooling, the sleeves 44 would shrink about the rigid support members 32 to thereby attach the thin mirror 10 to the rigid support structure 16. Alternatively, the attachment members 42 could be individually attached to the rigid support members 32 by heat shrinking and subsequently bolted or otherwise affixed to the rigid support structure 16 via the openings 34. Thereafter, subsequent to the final processing of the optical surface 28, the rigid support structure 16 would be unbolted or otherwise detached from the attachment members 42. Then, if desired, the attachment members 42 could be removed by localized heating to expand the sleeves 44. In such an embodiment, subsequent to the final processing of the optical surface 28 of the thin mirror 10 the rigid support structure 16 would be removed from the attachment members 42 and then connected to actuators upon installation of the thin mirror 10 into a system.

Figure 1C:
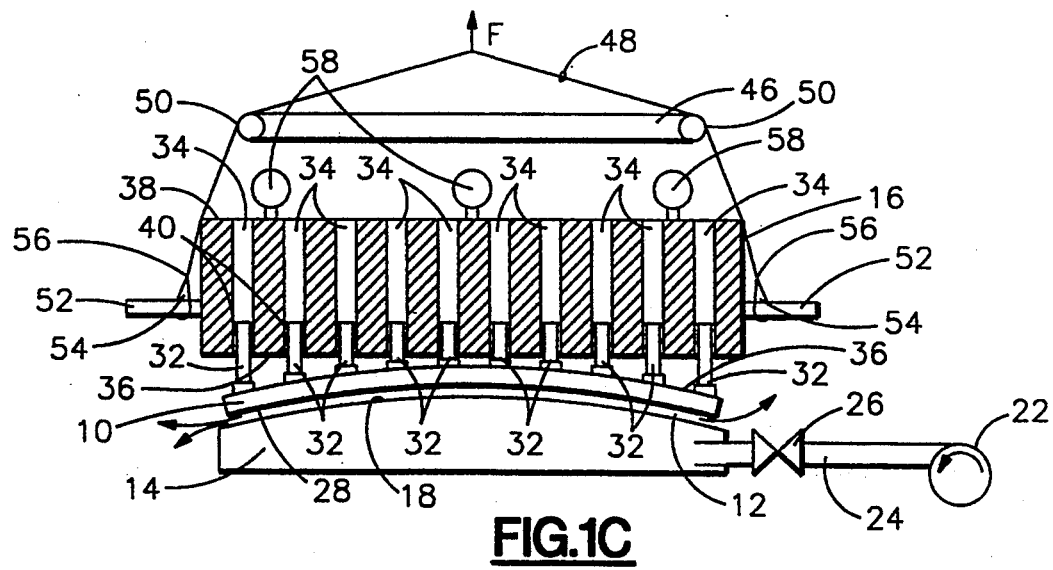

In this first technique, once the rigid support structure 16 is attached to the thin mirror 10, the entire structure is turned over. As shown in FIG. 1C, the rigid support structure 16 is turned over by use of a spreader bar 46. In the preferred embodiment, a lift cable 48, or chain, is guided over the ends 50 of the spreader bar 46 and attached to pivot rods 52 attached to opposing sides of the rigid support structure 16. Preferably, the cable 48, of chain, includes an opening 54 at each of the ends 56 thereof that is positionable over the pivot rods 52. Although many approaches can be used, these openings 54 will typically take the form of rings securely attached to the ends 56 of the cable 48, or chain, or the ends 56 of the cable 48, or chain, can simply be looped over and tied off. Such an arrangement allows the rigid support structure 16 to be rotated while suspended from the cable 48, or chain. Typically, the rigid support structure 16 will be a kinematic mounting structure having three kinematic mounting legs 58 extending from the rear surface 38 of the rigid support structure 16. As known in the art, the phrase "kinematic mounting" refers to the mounting of one member onto another member using the basic geometric principle that three nonlinear points define a plane. Hence, when the three nonlinear legs 58 are arranged to form a non equilateral triangle and positioned into three corresponding receptacles 60 disposed onto, in this case, a conventional finishing fixture 62 there is one, and only one, orientation for the mounting, and is achieved strain free.

Figure 1D:
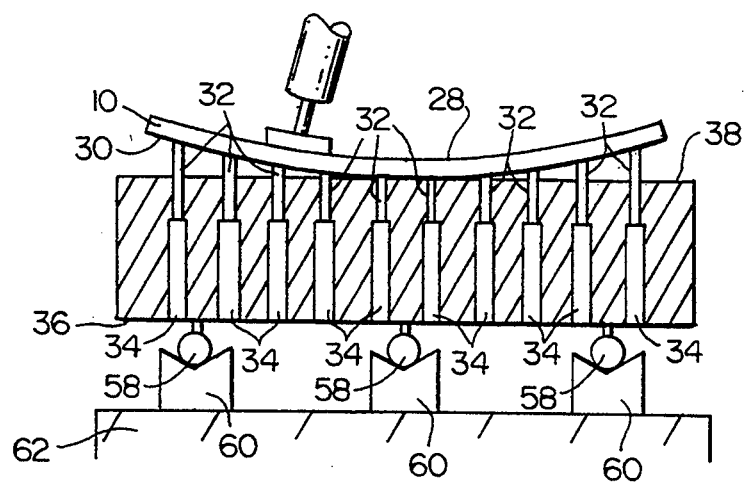

After the kinematic mount 16, with the thin mirror 10 attached, is lifted and inverted, the kinematic mount 16, as shown in FIG. 1D is then lowered to rest upon a conventional mirror finishing fixture 62 and the optical surface 28 of the thin mirror 10 is finished using conventional processes, such as, grinding and polishing.

Figure 3:
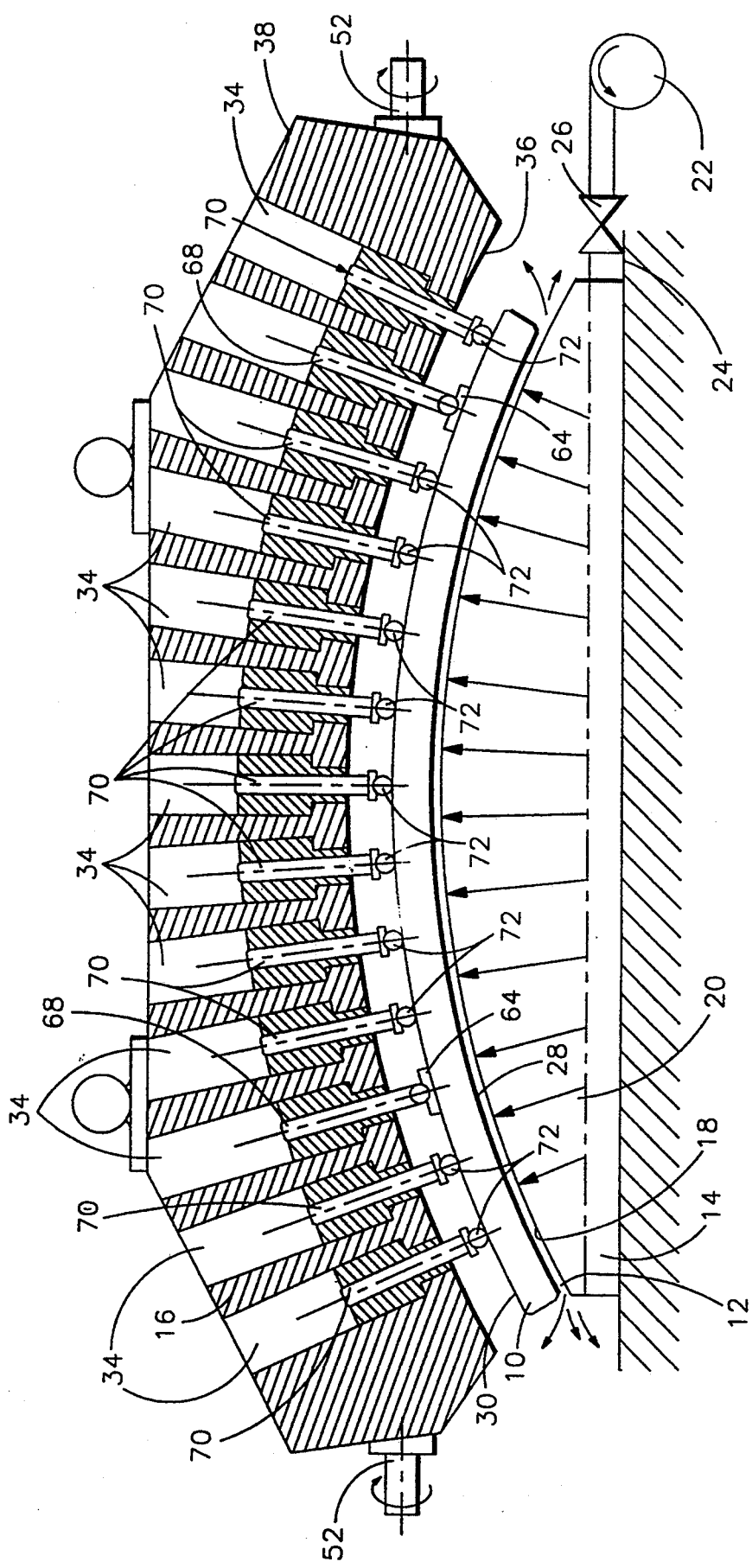
FIG. 3 which is a cross-sectional view of a rigid support structure for use in conjunction with the principles of the present invention.

In the second technique for interfacing the rigid support structure 16 to the rear surface 30 of the thin mirror 10, as shown in FIG. 3 wherein common elements are identified with previously used numerals, a second set of three kinematic mount receptacles 64 are attached to the rear surface 30 of the thin mirror 10, preferably prior to floating the thin mirror 10. As with the first technique, the receptacles 64 are, preferably, attached by use of an adhesive that does not require curing at temperatures above room temperatures.

As shown in FIG. 3, the rigid support structure 16, in this embodiment, is a kinematic mount that is fabricated so that the front surface 36 thereof has the same general curvature as the rear surface 30 of the thin mirror 10. In this second technique, the kinematic mount 16 is provided with a second set of kinematic mounting legs 66 protruding from the front surface 36 thereof and disposed such that when the kinematic mount 16 is lowered toward the rear surface 30 of the thin mirror 10, the legs 66 interface with the previously attached receptacles 64. Preferably, the legs 66 are provided with tooled, or spherical, ends 68. Hence, not only is the kinematic mount 16 accurately aligned with the thin mirror 10 and a good point of contact is achieved but other constraints and stresses and strains are avoided. The kinematic mount 16 is, in this technique, provided with a plurality of openings 34 extending from the front surface 36 thereof through the rear surface 38 thereof. In this embodiment, however, the axes of the openings 34 are preferably radial with the curvature of the front surface 36 of the kinematic mount 16. That is, each of the openings 34 is substantially perpendicular to the rear surface 30 of the thin mirror 10.

The thin mirror 10 is then floated and the kinematic mount 16 lowered into a kinematic interface position above the rear surface 30 of the thin mirror 10. Once the kinematic mount 16 is positioned such that the spherical ends 68 of the legs 66 interface, or engage, the kinematic mount receptacles 64 and point support rods 70, each preferably having a spherical contacting end 72, are inserted through the openings 34 of the kinematic mount 16. The number of point support rods 70 utilized in any given fabrication is determined by such factors as the size of the mirror, the weight and material thereof. In practice, the criteria for determining the number of rods 70 used is the number that provides sufficient rods such that the mirror deformation, when the mirror is supported, is within limits that will allow the ultimate surface finish specification to be accomplished through the use of conventional techniques, such as actuators. The point support rods 70 are allowed to come to rest on the rear surface 30 of the thin mirror 10. Thereafter, adhesive is introduced into the openings 34 from the rear surface 38 to secure the point support rods 70 within the openings 34. This second technique is advantageous since it provides a large number of supports that are easily positioned and which support the thin mirror 10 without inducing internal stresses and strains.

Once the point support rods 70 are secured within the openings 34 the kinematic mount 16 is lifted, i.e., disengaged from the thin mirror 10, inverted and positioned in conventional mirror finishing fixture 62 as in the above-described first technique. Thereafter, the thin mirror 10 is lifted, inverted and reseated, or joined, with the kinematic mount 16 for final optical surface processing. It will be readily recognized that the use of the plurality of point support rods 70, in itself, provides a significant advantage over the conventional placement of a thin optic onto a shaped granite block since the rear surface 30 of the thin mirror 10 does not have surface instabilities that introduce stresses and strains during the finishing of the optical surface 28.

Figure 1E:
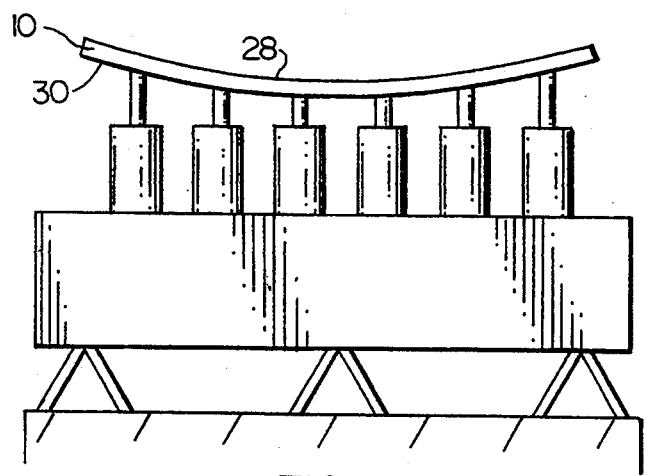

Regardless of which of the techniques is employed for interfacing the rigid support structure 16 with the thin mirror 10, upon completion of the optical surface 28, the thin mirror 10 is removed from the rigid support structure 16. Thereafter, as shown in FIG. 1E, the thin mirror 10 can be installed into an operational system. As shown, such a system usually includes a plurality of actuators for correcting for surface deformation in the optical surface 28 of the thin mirror 10.

Although the present invention has been described herein with respect to one or more specific embodiments, it will be understood that other arrangements and other steps can be developed that do not depart from the spirit and scope hereof. Hence, the present invention is deemed limited only by the appended claims and the reasonable interpretation thereof.

What is claimed is:

1. A method for use in fabricating and/or testing a thin mirror, said thin mirror having an optical surface and a rear surface, said method comprising the steps of:
   floating said thin mirror on an air bearing such that the optical surface thereof is facing said air bearing;
   interfacing, while said thin mirror is floating, a rigid support structure with said thin mirror;
   inverting said thin mirror; and
   finishing said optical surface thereof while said thin mirror is supported by said rigid support structure.

2. The method as claimed in claim 1, wherein said interfacing step includes attaching said rigid support structure to said rear surface of said thin mirror.

3. The method as claimed in claim 2, further comprising the steps of: affixing a plurality of rigid support members to said rear surface of said thin mirror;
   providing openings through said rigid support structure, said openings being provided such that said openings are aligned with said rigid support members; and
   wherein said step of attaching said rigid support structure to said thin mirror includes;
   removably attaching said rigid support structure to said rigid support members.

4. The method as claimed in claim 3 wherein said step of affixing a plurality of rigid support members to said rear surface of said thin mirror includes the step of:
   removably affixing said plurality of rigid support members to said rear surface of said thin mirror prior to said step of floating said thin mirror on an air bearing.

5. The method as claimed in claim 4 wherein said step of removably affixing said rigid support structure to said rigid support members includes the steps of:
   introducing an adhesive into said openings; and
   allowing said adhesive to cure at about room temperature.

6. The method as claimed in claim 5 further comprising the step of:
   dissolving, subsequent to said finishing of said optical surface, said adhesive at about room temperature such that said rigid support structure can be removed from said rigid support members.

7. The method as claimed in claim 5 further comprising the step of:
   removing, subsequent to said finishing of said optical surface, said rigid support members form said rear surface of said thin mirror.

8. The method as claimed in claim 3 wherein said step of attaching said rigid support structure to said rigid support members further includes the step of:
   providing each said opening with an attachment member, each said attachment member being provided with a sleeve extending toward said rear surface of said thin mirror, and each said sleeve being sized such that upon heating said sleeve, said sleeves can be placed over said rigid support members.

9. The method as claimed in claim 8 further comprising the step of allowing said sleeves to cool such that said sleeves form a shrink fit about said rigid support members upon contraction.

10. The method as claimed in claim 9 further comprising the step of: removing, subsequent to said finishing of said optical surface, said sleeves form said rigid support members.

11. The method as claimed in claim 10 wherein said rigid support structure removing step includes the step of applying localized heat to said sleeves such that upon expansion of said sleeves said rigid support structure can be removed from said rigid support members.

12. The method as claimed in claim 3 wherein said inverting step includes the step of:
   lifting said rigid support structure having said thin mirror affixed thereto.

13. The method as claimed in claim 1 wherein said interfacing step includes;
   forming a rigid support structure having a first surface of the same general curvature as said rear surface of said thin mirror.

14. The method as claimed in claim 13 wherein said interfacing step further includes:
   providing kinematic receptacles on said rear surface of said thin mirror;
   providing kinematic legs on said first surface of said rigid support structure, said legs being provided such that each interfaces with one of said kinematic receptacles on said rear surface of said thin mirror during said interfacing step.

15. The method as claimed in claim 14 further including the steps of:
   providing a plurality of openings through said rigid support structure, the axes of said openings being substantially perpendicular to said rear surface of said thin mirror.

16. The method as claimed in claim 15 wherein said interfacing step further comprises the steps of:

inserting a plurality of point support rods into said openings in said rigid support structure such that said point support rods contact said rear surface of said thin mirror; and securing said point support rods within said openings.

17. The method as claimed in claim 16 wherein said inverting step includes the steps of:

disengaging said rigid support structure from said thin mirror;

inverting said rigid support structure subsequent to said disengaging step;

inverting, said thin mirror; and reseating said thin mirror onto said point support rods of said rigid support structure such that said kinematic legs interface with said kinematic receptacles.

* * * * *